C. B. MURDOCK.
CURRENT MOTOR.
APPLICATION FILED JULY 2, 1912.

1,047,274.

Patented Dec. 17, 1912.
6 SHEETS—SHEET 1.

Witnesses
Rosina T. Finotti
W. Wallace Nairn Jr.

Inventor
Charles B. Murdock,
By Julian C. Dowell,
his Attorney

Fig. 4

C. B. MURDOCK.
CURRENT MOTOR.
APPLICATION FILED JULY 2, 1912.

1,047,274.

Patented Dec. 17, 1912.
6 SHEETS—SHEET 4.

C. B. MURDOCK.
CURRENT MOTOR.
APPLICATION FILED JULY 2, 1912.

1,047,274.

Patented Dec. 17, 1912.
6 SHEETS—SHEET 6.

Witnesses
Rosina J. Finotti
W. Wallace Nairn Jr.

Inventor
Charles B. Murdock
By Julian C. Dowell
his Attorney

COLUMBIA PLANOGRAPH CO., WASHINGTON, D. C.

UNITED STATES PATENT OFFICE.

CHARLES B. MURDOCK, OF WENATCHEE, WASHINGTON.

CURRENT-MOTOR.

1,047,274.   Specification of Letters Patent.   Patented Dec. 17, 1912.

Application filed July 2, 1912. Serial No. 707,308.

*To all whom it may concern:*

Be it known that I, CHARLES B. MURDOCK, a citizen of the United States, residing at Wenatchee, in the county of Chelan and State of Washington, have invented certain new and useful Improvements in Current-Motors; and I do hereby declare the following to be a full, clear, and exact description of the invention, such as will enable others skilled in the art to which it appertains to make and use the same.

This invention relates to current motors of the submerged type having a plurality of radial wings carried by a rotatable frame or wheel and adapted to close when receiving the impact of the current and open when returning against the current.

An object of the present invention is to develop more power with a motor or wheel of given dimensions than is possible with one of ordinary construction in which the wings are held at the same distance from the axis throughout an entire revolution.

Another object is to provide for quickly stopping the rotation of the frame or wheel without jarring the same or subjecting it to any greater strains, due to the impact of the current, than are necessarily encountered when in operation; and a further object is to provide for readily starting the wheel or frame to rotating again when desired.

Other subsidiary objects will become apparent as the description proceeds.

The invention will first be hereinafter more particularly described with reference to the accompanying drawings, which form a part of this specification, and then pointed out in the claims at the end of the description.

In the accompanying drawings, Fig. 11ª is a detail of one of the horizontal roller bearings for the wings.

The desired increase in the power developed by the motor is obtained by moving the source of current pressure a greater distance from the center of power development during the impact of the current than when returning against the current. I have provided for moving the wings radially outward, when they are to receive the impact of the current, and inward again when they are to return against the current. In this way, the active wings, constituting the source of current pressure at a given time, are arranged at a greater distance from the axis or center of power development than are the inactive wings. The leverage of the active wings is thus increased and the power of the motor consequently augmented. The power of the motor is further increased by the provision of curtains for closing the spaces near the axis of the frame which are vacated when the wings are moved outward.

Each of the wings may be composed of a plurality of independently hinged blades adapted to overlap one another when closed to receive the impact of the current and to open with the current when moving against the same. In order to quickly stop the rotation of the frame or wheel without jarring or subjecting it to the strain exerted by the impact of the current against the closed wings, I provide means for releasing the blades of the active wings and for unfastening the curtains therefrom, whereby said blades are permitted to swing open with the current and said curtains are allowed to roll up or collapse. It is obvious that the result of these operations will be to equalize the pressure of the current on both sides of the axis of the frame so that the necessary impact for rotating said frame will be destroyed, whereupon the latter will soon come to rest.

It is equally obvious that in order to start the frame to rotating again it will be necessary to return the blades to their normal overlapping positions or connect the curtains to the wings. The blades are adapted to overlap again as soon as their wings are once more brought into position to receive the impact of the current, and means are provided for manually turning the frame a part revolution in order to bring said wings in position to receive said impact. The curtains are automatically connected to the wings as the latter are moved to the inner ends of their radial strokes on the inactive side of the frame.

In practice, the rotatable frame or wheel 1 is mounted upon a shaft 2 supported by anti-friction bearings $2^a$ on journal boxes $2^b$ carried by a suitable frame-work 3. The bearings and journal boxes are packed at $3^a$ to render them sand proof. Upper and lower sets of radial arms 4 are secured to the shaft to turn therewith by having their inner ends bolted or otherwise fastened to hubs 5 fast on said shaft. The radial arms of the upper set are arranged in vertical alinement with those of the lower set, thereby providing pairs of arms adapted to support the wings 6 in vertical position between them.

Figure 2:
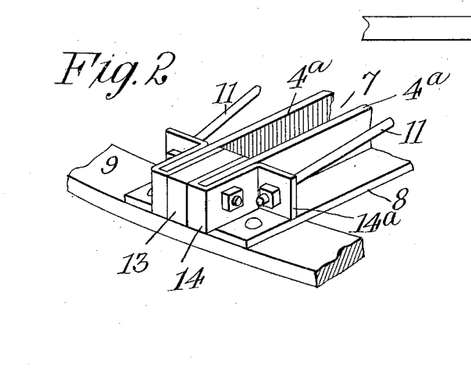
Fig. 2 is a detail perspective view of the outer end of one of the radial arms of the rotatable frame or wheel.
Figure 3:
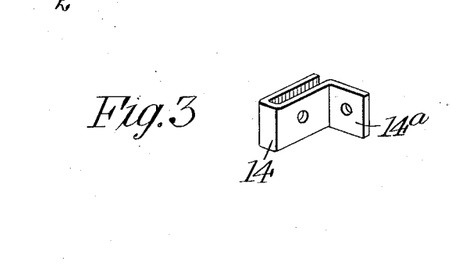
Fig. 3 is a detail view of one of the brackets mounted on the ends of said arms for securing the guys.

Each of the radial arms 4 may consist of two angle-bars $4^a$ arranged parallel to each other but spaced apart and having their horizontal flanges extending in opposite directions, as best illustrated in Fig. 2. The space between the vertical flanges of the angle-bars constitutes an open channel or slot 7. The vertical flanges of the angle-bars of the upper radial arms preferably extend upwardly, while those of the lower arms extend downwardly, whereby horizontal or transverse bearing surfaces 8 are provided by the horizontal flanges on the confronting faces of said upper and lower arms. One or more concentric rings 9 may be secured to each set of radial arms for spacing them apart and producing rigid structures. Corresponding rings attached to the upper and lower arms may be connected by tie-rods 10 for maintaining the arms of each pair at a uniform distance apart throughout their lengths. The outer ends of the arms have guys 11 secured thereto, said guys extending upwardly from the upper arms and downwardly from the lower arms and being secured to disks 12 fixed to the shaft at suitable distances above and below the hubs 5. As illustrated in Fig. 2, a spacing block 13 may be interposed between the outer ends of each pair of angle-bars constituting a radial arm for maintaining the desired uniform channel or slot 7. Brackets 14 are fitted over the outer extremities of the vertical flanges of said angle-bars at either side of the spacing block, and are provided with outwardly projecting portions $14^a$ to which the guys 11 are secured. It will be observed that the rotatable frame comprising the upper and lower radial arms 4, the rings 9, tie-rods 10, and guys 11 is made very rigid by the construction described, whereby it is well adapted to support the wings in operation.

Each wing 6 is composed of a plurality of blades 15 independently hinged upon vertical rods 16 extending between upper and lower horizontal bars 17. Said vertical rods are spaced apart according to the widths of the blades, and the latter are hinged to the rods so that the margins of their hinged edges project a little beyond the hinges, as at $15^a$. The free edge of each blade is adapted to overlap the projecting margin $15^a$ of the adjacent blade, but terminates short of the hinge rod of said adjacent blade when folded into the plane of the bars 17. The free edge of the innermost blade is adapted to engage stops 18 on the innermost vertical rod $16^a$ when in closed position.

Each wing as a whole is mounted to slide radially between its pair of upper and lower radial arms, and may be guided in its reciprocations by two sets of guides. One set comprises roller bearings 19 secured to the horizontal bars 17 and engaging the transverse surfaces 8 of the radial arms. The other set of guides consists of roller bearings 20 mounted on upper and lower extensions of certain of the rods 16 and fitting loosely in the channels 7 in said radial arms. Two guides of each set are shown on the upper and lower edges of each wing, and are arranged near the inner edge and at an intermediate point thereof. As illustrated, the bearings 20 are carried respectively by the hinge rods of the innermost blade and the fourth blade counting outwardly, when the wing is composed of six blades, as shown. It will be understood, however, that the wings may be subdivided into a greater or less number of blades to suit requirements. One set of bearings is placed at an intermediate point on each wing in order to allow for the radial movement of the wing along or between the radial arms. It will be noted by reference to Fig. 1 that in the extreme outward position of the wings, their outer sets of guiding bearings are arranged near the outer ends of the radial arms. The wings may be reinforced at their outer ends by extra pieces 17$^a$ overlapping the horizontal bars 17 beyond the outer guides.

In order to release the blades of the wings from their overlaps so that they will be free to swing with the current for stopping the motor as already indicated, the innermost blade of each wing is mounted to move vertically upward a sufficient distance to bring notches 21, formed in its free edge, into register with the stops 18. It is obvious that when the free edge of the innermost blade is released in this way, said blade will swing with the current upon the impact of the same against it and that as it swings to such open position its projecting margin 15$^a$ will be withdrawn from the path of the free edge of the second blade. The latter will then be able to swing open releasing the third blade, and so on in succession until all the blades are released.

Figures 5, 6, 7:
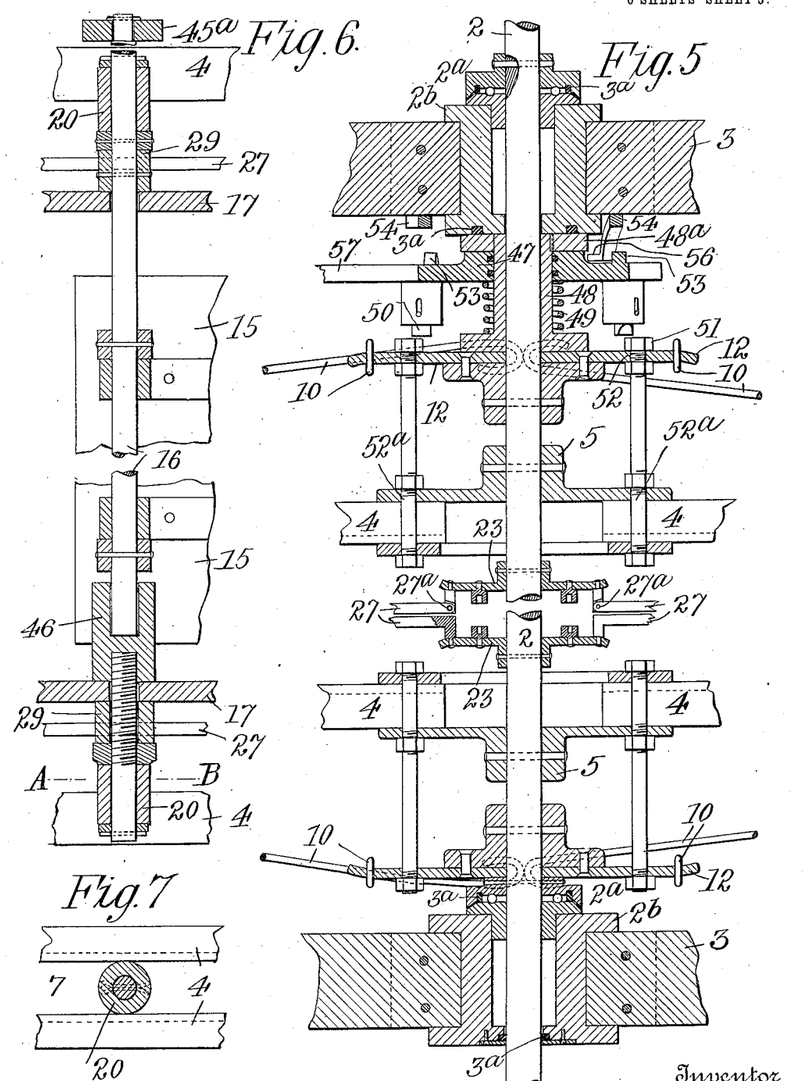
Fig. 5 is an enlarged broken section taken centrally along the axis of the motor, illustrating more particularly the sand-proof bearings and the means for supporting the oscillatory starting device.
Fig. 6 is a detail broken section taken along the pivotal axis of one of the innermost blades of the wings.
Fig. 7 is a detail horizontal section on the line A—B of Fig. 6.
Figure 8:
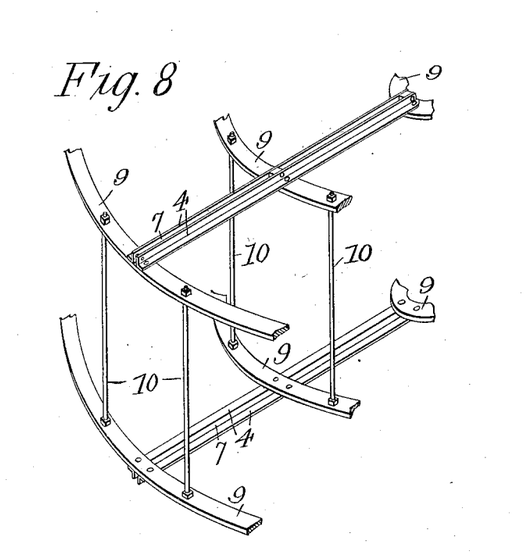
Fig. 8 is a perspective view of a portion of the rotatable frame with the wing removed.
Figure 9:
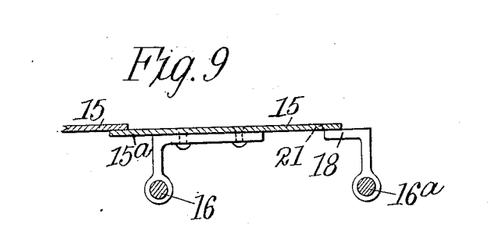
Fig. 9 is an enlarged horizontal section through one of the innermost blades, illustrating how its free edge engages the stop and its opposite edge is engaged by the free edge of an adjacent blade.
Figure 10:
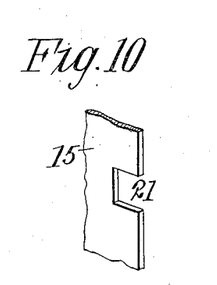
Fig. 10 is a fragmentary perspective view of the free edge of one of the innermost blades, showing the notch therein.
Figure 11:
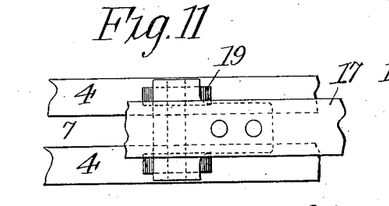
Fig. 11 is an enlarged fragmentary plan view of a radial arm and a wing-guide engaging the transverse bearing surfaces of said arm.
Figure 11A:
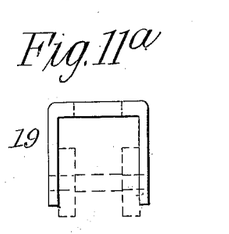

Roller curtains 22, corresponding in number to the wings, are mounted close in around the shaft 2 between suitable disks 23 arranged adjacent and inwardly of the drums 5. Each curtain may be mounted on a spring roller 24, whereby it is adapted to automatically collapse or roll up when its outer edge is released. Said curtains are preferably made of two thicknesses of canvas having arranged between them reinforcing rods 25 and diagonal braces 26 of tape steel or the like. The ends 25$^a$ of the rods 25 project beyond the upper and lower edges of the curtains and are adapted to run between pairs of spaced guide strips 27 which are connected at their inner ends to the disks 23 and have their outer ends extending through passages 28 provided therefor in sleeves 29 on the projecting portions of the hinge rods of the innermost blades. The lower guide strips 27 may be rigidly fastened to the lower disk 23 but the upper guide strips should be hinged at their inner ends, as at 27$^a$, to the upper disk 23, (see Figs. 5, 12 and 16).

Figures 12, 13, 14, 15, 16:
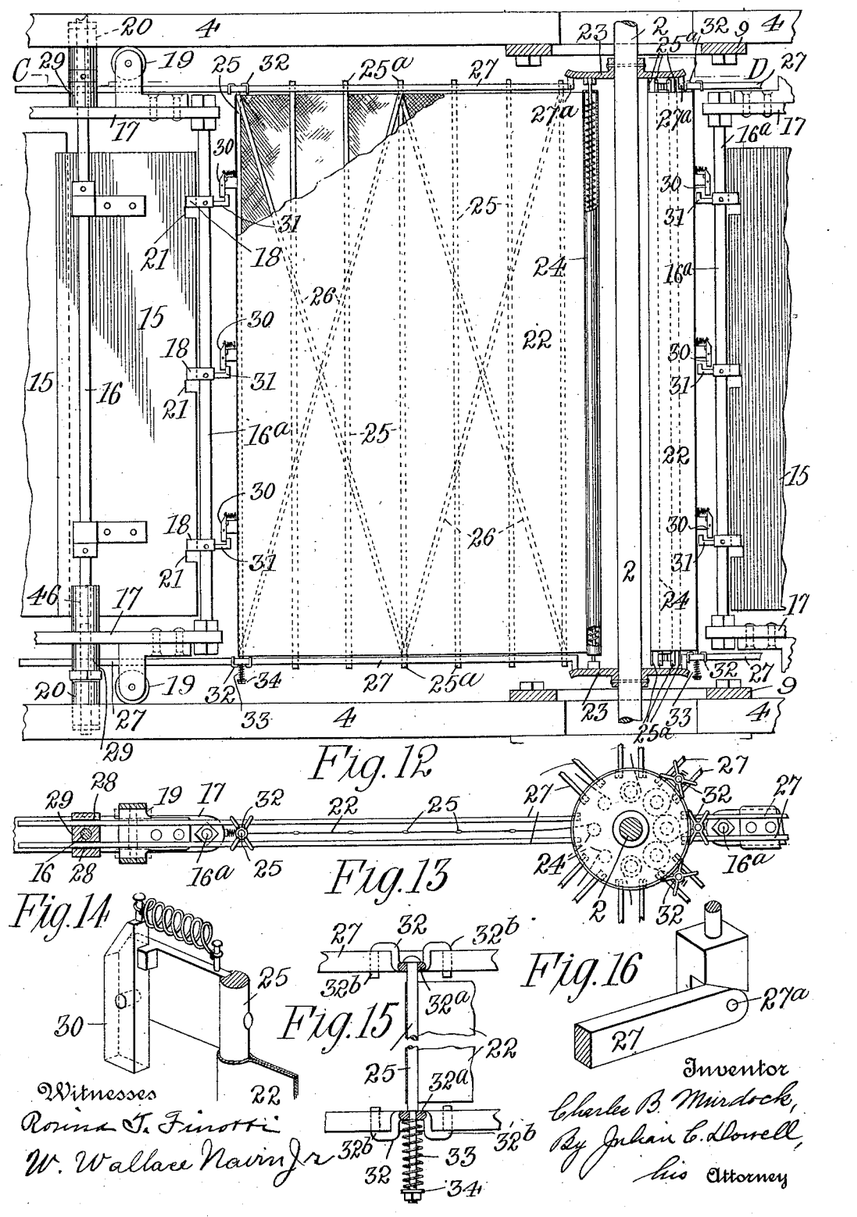
Fig. 12 is an enlarged broken vertical section of the inner portion of the rotatable frame showing one of the curtains extended and another one collapsed, parts being broken away to disclose the construction of said curtains.
Fig. 13 is a horizontal section on the line C—D of Fig. 12.
Fig. 14 is an enlarged detail view of one of the latches carried by the outer edges of the curtains.
Fig. 15 is a broken detail view of one of the reinforcing rods carried by the outer edges of the curtains, and the guide strip embracing devices mounted on the ends of said rods.
Fig. 16 is an enlarged detail view of the inner pivoted end of one of the upper guide strips.

The reinforcing rod 25 at the outer edge of each curtain carries spring latches 30 adapted to normally engage keepers 31 on the innermost vertical rod 16$^a$ which also carries the stops 18 for the innermost blade. The ends of said reinforcing rod at the outer edge of the curtain are fitted with riders 32 embracing the guide strips 27. Each rider may be formed as a spider having an intermediate or central portion 32$^a$ arranged between a pair of guide strips, and outwardly bent portions or arms 32$^b$ embracing both guide strips, there being two arms engaging each strip and extending at both sides of said intermediate portion, as best illustrated in Figs. 13 and 15, for preventing said outer reinforcing rods from turning enough to move the latches 30 laterally out of engagement with the keepers 31. The upper rider is rigidly secured to its reinforcing rod, while the lower rider is mounted to slide thereon, being retained in engagement with the lower guide strips by a spring 33 abutting at its upper end against said rider and at its lower end against a nut 34 on the lower extremity of the rod. The arrangement of parts just described is such that when the outer ends of the upper guide strips 27 are raised, the reinforcing rods at the outer edges of the curtains will be carried upward with them by reason of their connection to the same through the upper riders 32, said rods compressing the springs 33 during such upward movement and leaving the lower riders constantly in engagement with the lower guide-strips. The upward movement of said rods is sufficient to disengage the latches 30 from the keepers 31 so that the curtains may automatically roll up or collapse. The latches become reëngaged with the keepers when the latter are moved radially to the limit of the inward stroke of the wings, said latches permitting said keepers to pass them on the inward stroke but retaining them in connection therewith on the outward stroke, whereby the curtains are normally reciprocated with the wings.

Figure 1:
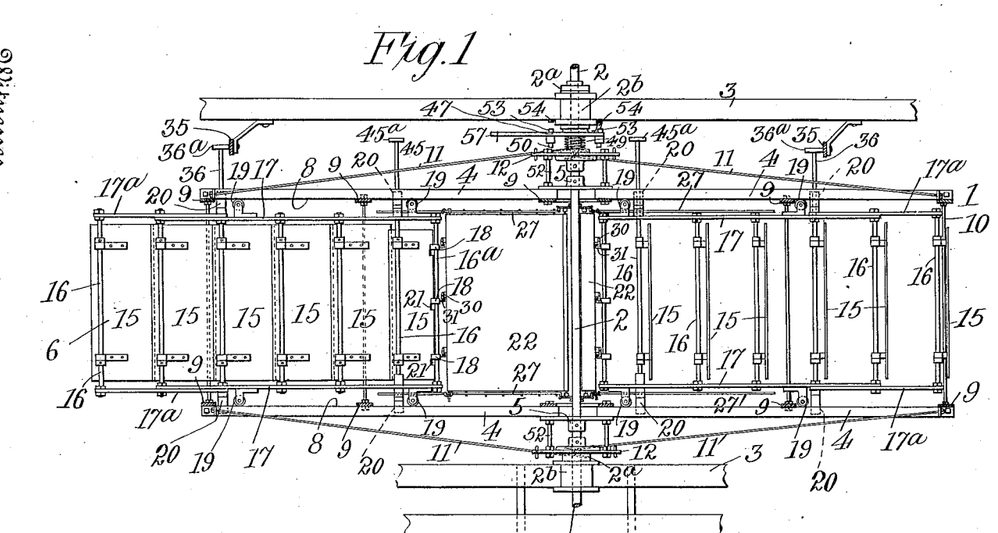
Figure 1 is a central vertical sectional view of the motor taken transversely thereof and looking up stream or in the direction from which the current flows.
Figure 4:
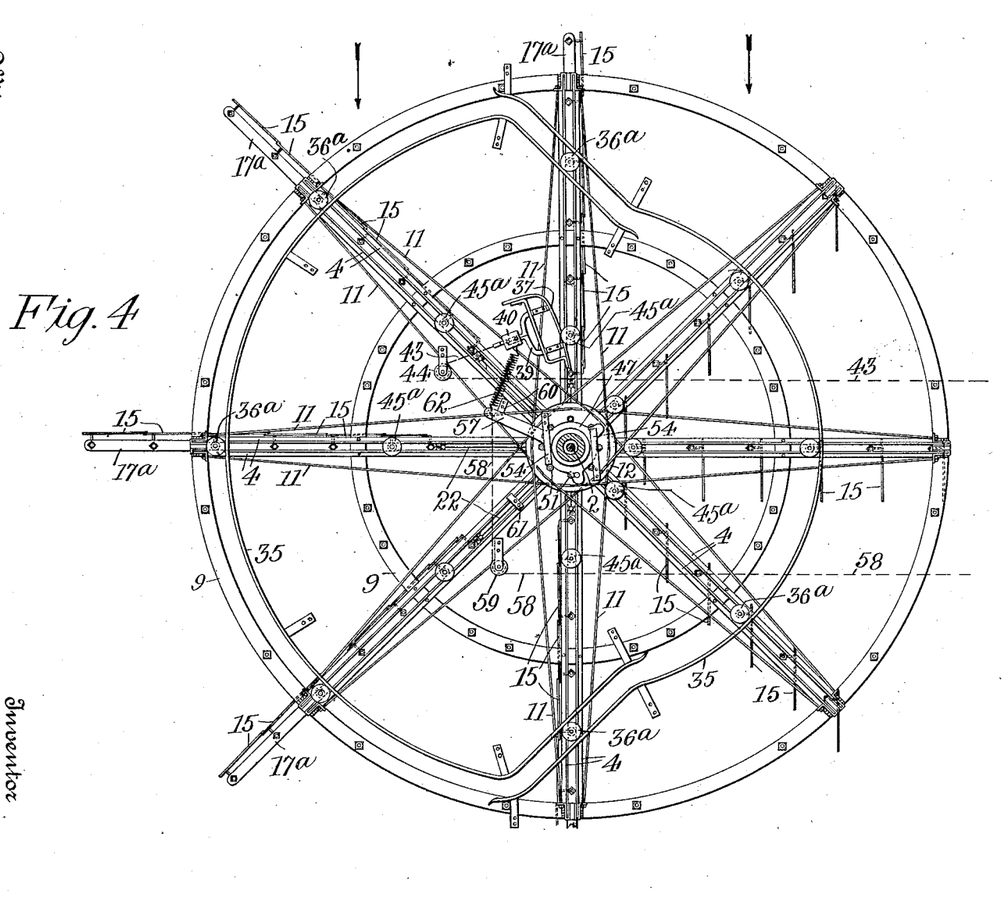
Fig. 4 is a plan view of the motor, the upper portion of the frame work on which it is journaled being removed.

The wings are reciprocated radially by means of projections 36 thereon engaging a cam 35 preferably secured to the upper portion of the framework 3. As illustrated, said projections are formed as extensions of the hinge rods which carry the outer bearings 20. These projections extend upward through the channels or slots 7 in the upper radial arms and carry rollers 36ª for engagement with the cam 35. As shown in Figs. 1 and 4, substantially half of the cam is arranged near the outer spacing ring 9, while the other half is located near the inner spacing ring. The difference in the distances of said portions of the cam from the axis of the rotatable frame governs the throw or length of the reciprocal movement of the wings and may, of course, be varied as circumstances require. The parts of the cam which constitute transitions from its inner half to its outer half are preferably arranged in a vertical plane parallel to the direction of the current, the outer half of said cam being located on the active side of the wheel and the inner half thereof on the inactive side of said wheel.

Supported from the upper part of the frame work 3 is a track 37 carried by brackets 38 which permit a limited vertical movement thereof, but which retain it against horizontal movement. A lever 39 is pivoted intermediate of its ends to a fixed bracket 40 and has end portions 41 extending beyond the track, while its opposite end 42 is connected to a cable 43 passed around a pulley 44 and extending into convenient reach of the operator. The hinge rods of the innermost blades of the wings are provided with upward projections 45 extending through the channels or slots 7 in the upper radial arms and carrying rollers 45ª normally arranged slightly above the level of the track 37 when the latter is in its lowered position. As the frame or wheel rotates, said rollers 45ª will successively pass along and above the track. When the track is raised by pulling upon the cable 43, which actuates the lever 39 to accomplish this movement, said rollers will ride up the inclined end 37ª of the track, thereby raising the innermost blades of the wings a sufficient distance to bring the notches in their free edges into register with the stops 18, and also raising the outer edges of the curtains, so that their latches are disengaged from the fixed keepers 31 by reason of the described connection between the upper guide strips 27 and the sleeves 29 on said hinge rods. The guide-rollers 20 on said hinge rods are long enough to permit the vertical movement of the latter without disengaging said rollers from the channels 7. The lower ends of said hinge rods may terminate above the lower horizontal bars 17 of the wings and be seated in socket pieces 46 (see Fig. 6) secured to said lower bars. As shown, the lower roller guide 20, corresponding to the upper one carried by said hinge rod, is fastened to the under surface of the lower bars 17 in alinement with the socket piece 46. It will be understood, of course, that the sockets in said socket pieces are deep enough to permit the hinge rods to be raised the requisite distance for releasing the blades and curtains without withdrawing the lower ends of said rods from said sockets.

The track 37 is so positioned that the rollers 45ª will begin to ride up thereon as their wings commence to move outwardly through the transition portion of the cam 35 leading from its inner half to its outer half, and said track is of sufficient length to hold the innermost blades of the successive wings in their raised positions until said wings have moved across the current far enough to receive the impact thereof upon their blades for swinging the latter open as already described. When this has been effected, the rollers will ride off of the track, allowing the innermost blades to drop again into normal position where their free edges will again engage the stops 18 on the next revolution of the wheel.

Figures 17, 18, 19:
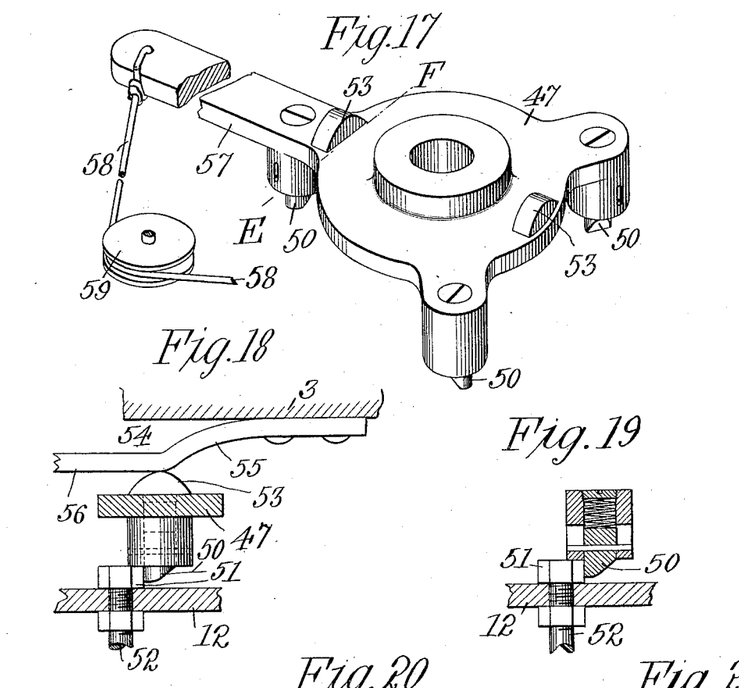
Fig. 17 is an enlarged detail perspective view of the oscillatory starting member or plate.
Fig. 18 is an enlarged detail section of said oscillatory member or plate taken on the line E—F of Fig. 17, and showing its operative position relative to the fixed depressing cam and the projection on the upper end of the rotatable frame.
Fig. 19 is a detail central section of one of the spring-pressed lugs on the oscillatory plate, said lug being illustrated as operatively engaging said projection on the frame.
Figures 20, 21, 22, 23, 24:
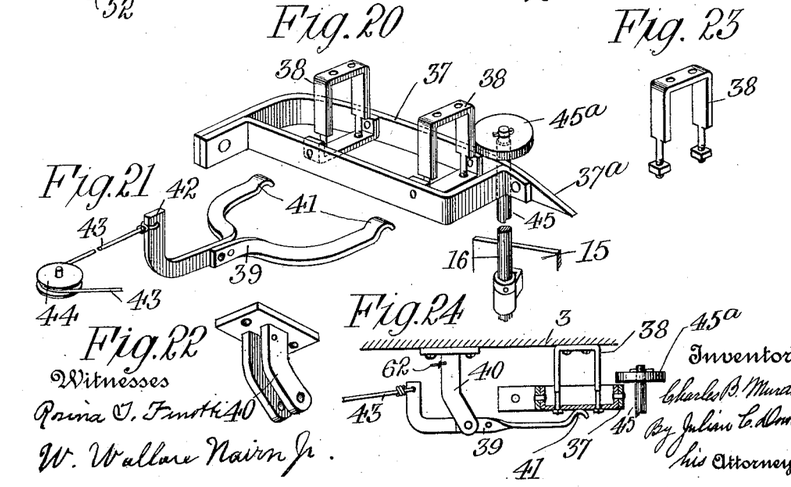
Fig. 20 is a detail perspective view of the track for releasing the innermost blades of the wings from their stops.
Fig. 21 is a similar view of the lever for raising said track.
Figs. 22 and 23 are similar views of the brackets for supporting said lever and track respectively.
Fig. 24 is an enlarged broken vertical section of the upper portion of the motor, illustrating the several parts of the stopping mechanism assembled.

The starting mechanism comprises a plate or member 47 mounted to oscillate upon a spool 48 fitted around the shaft between the upper disk 12 and the journal box for the shaft in the upper portion of the framework 3. Said spool is constructed with a removable flange 48ª at one end to permit the oscillating member to be slipped on above and in contact with a coil spring 49. On the under-surface of the oscillating member there are arranged a plurality of spring-pressed ratchet lugs 50 normally extending near to but terminating above the plane of lugs or projections 51 on the upper surface of the disk 12. As shown, these lugs or projections 51 may consist of nuts on the ends of upward extensions 52 of bolts 52ª fastening the upper radial arms to the upper hubs 5. On the upper surface of the oscillating member and preferably at diametrically opposite sides of its pivot, there are formed rounded lugs 53 extending into the path of fixed cams 54 depending from the framework 3. Two of the lugs 53 and cams 54 have been illustrated, but it will be understood that a greater or less number of each may be employed if found necessary or desirable. Each of the cams comprises a downwardly inclined portion 55 (see Figs. 5 and 18), which normally extend below the plane of the upper surface of the lugs 53, and a horizontal portion 56. An arm 57 projects radially from the plate or member 47 and is connected near its outer end to a cable 58 which is passed over a pulley 59 and extends into convenient reach of the operator. The oscillatory movement of said plate or member is limited by two fixed stops 60 and 61 in the path of the arm 57, and the latter is normally held in contact with one of said stops by a spring 62. A pull upon the cable 58 will move the arm 57 toward the other stop against the influence of the spring, and such movement will cause the lugs 53 to ride down the inclined portions 55 of the cams 54 so as to depress the plate or member 47 sufficiently to bring the ratchet lugs 50 into the plane of the lugs 49 on the disk 12. This depression of the oscillating member takes place as the arm 57 is passing through approximately one-half of its arch of movement. During the remaining portion of the stroke of said arm, the lugs 53 will ride along the horizontal portions 56 of the cams 54, thus retaining said member at the lower level where its ratchet lugs may engage the lugs or projections on the disks 12 for turning the rotatable frame or wheel a part revolution. As soon as the cable is released, the spring 62 will return the oscillating member to its normal position after which the operation may be repeated as many times as are necessary to turn said rotatable frame until its wings receive the impact of the current. During the oscillation of the member 47, the ratchet lugs 50 carried thereby will engage the lugs or projections 51 on the rotatable frame for turning the latter in the proper direction for starting the same, while said ratchet lugs will automatically ride over the lugs on the frame when moving in the reverse direction.

While the operation of the motor is probably understood from the foregoing description, it may be briefly explained as follows: When the rotatable frame or wheel is partly or entirely submerged in a moving stream with the current flowing in the direction indicated by arrows in Fig. 4, the blades of the wings on the left hand side of the frame will be automatically closed by the impact of the current and said impact upon the closed blades will cause said frame to revolve. The blades of the wings on the right hand side of the frame will automatically open under the pressure of the current as they move against it, said blades being turned to positions substantially parallel to the direction of the current. As each wing passes from the right to the left hand side, it is moved radially outward by the roller 36ᵃ on its projection 36 following the cam 35 with the result that the active wings, which are receiving the impact of the current for operating the motor, are arranged a greater distance from the axis than the inactive wings which are returning on the right hand side against the current. As each wing approaches the point where it passes from the active left hand side to the inactive right hand side, it is moved radially inward by the cam. The curtains 22 being normally secured to the inner edges of the wings by the latches 30 and keepers 31, follow the radial movement of their respective wings, whereby the area of the surfaces of the active wings, which receive the impact of the current, are considerably augmented, while the curtains of the inactive wings are rolled up or collapsed. When it is desired to stop the motor, a pull on the cable 43 will raise the track 37 into the path of the rollers 45ᵃ mounted on the projections 45 of the wings with the result that as each wing moves from inactive to active position its blades are released so that they are free to swing open, permitting the current to flow through the wing, thereby nullifying the effect of the impact of the current and rendering the wings inactive. Simultaneously with the release of the blades, the curtain is disengaged from the inner edge of the wing so that, as the latter is moved radially outward, the curtain will be left behind and the space between the inner edge of the wing and axis of the frame will be open to the free flow of the current through the same. As soon as the full quota of the normally active wings have been rendered inactive in this manner, the frame will cease to rotate for the reason that no sufficient obstructions are presented by its wings to receive the impact of the current. The starting of the motor again is accomplished by manually turning the rotatable frame through the oscillation of the member 47 by pulling intermittently on the cable 58, said member being thereby depressed to bring its ratchet lugs 50 into engagement with the lugs or projections 51 on said frame.

Having thus described my invention, what I claim as new and desire to secure by Letters Patent is:

1. In a current motor, the combination of a rotatable frame comprising pairs of radial arms, wings mounted in the planes of the respective pairs of arms and movable radially thereon, and supporting guides on said wings running on said arms and arranged near the inner ends and at intermediate points of the wings, the latter being reinforced beyond the outer guides.

2. In a current motor, the combination of a rotatable frame, radial wings thereon, each wing comprising a plurality of independently hinged blades adapted to overlap for closing the wings when they receive the impact of the current and to swing open with the current when they are moving against the same, and means to move said wings outwardly when they are to receive the impact of the current.

3. In a current motor, the combination of a rotatable frame, comprising radial arms, each consisting of two oppositely facing parallel angle-bars secured near together but leaving a channel between them, the oppositely extending flanges of said angle-bars constituting transverse bearing surfaces, wings mounted to move along said arms, guides on the wings extending into said channels, and other guides bearing upon said transverse surfaces.

4. In a current motor, the combination of a rotatable frame comprising radial arms, each consisting of two parallel bars secured near together but leaving a channel between them, spacing blocks between said bars, brackets secured to the outer end portions of said bars, guys connected to said brackets, wings mounted to move along said arms, and guides on the wings engaging in said channels.

5. In a current motor, the combination of a rotatable frame, radially movable wings thereon, and means for closing the space near the axis of the frame which is vacated when said wings are moved outward.

6. In a current motor, the combination of a rotatable frame, radially movable wings thereon, means for moving said wings outward when they are to receive the impact of the current, and means for closing the space near the axis of the frame which is vacated when said wings are moved outward.

7. In a current motor, the combination of a rotatable frame, radially movable wings thereon, each wing having a plurality of independently hinged blades adapted to close when the wing is to receive the impact of the current and to open when moving against the current to allow the latter to flow through said wing, and means for moving the wings outward when the blades are closed.

8. In a current motor, the combination of a rotatable frame, radially movable wings thereon, each wing having a plurality of independently hinged blades adapted to close when the wing is to receive the impact of the current and to open when moving against the current to allow the latter to flow through said wing, means for moving the wings outward when the blades are closed, and means for closing the space near the axis of the frame which is vacated when said wings are moved outward.

9. In a current motor, the combination of a rotatable frame, radially movable wings thereon, and extensible means adapted to close the space near the axis of the frame which is vacated when said wings are moved outward.

10. In a current motor, the combination of a rotatable frame, radially movable wings thereon, and extensible means adapted to close the space near the axis of the frame which is vacated when said wings are moved outward, said means also adapted to contract automatically when the wings are moved inward.

11. In a current motor, the combination of a rotatable frame, radially movable wings thereon, and automatically collapsible curtains mounted around the axis of the frame and connected to the inner edges of the wings, whereby said curtains will follow the movement of said wings.

12. In a current motor, the combination of a rotatable frame, radially movable wings thereon, curtains mounted around the axis of the frame and connected to the inner edges of the wings, whereby said curtains will follow the movement of said wings, guide strips at the edges of said curtains, and projections arranged at intervals on the edges of the curtains and engaging said guide strips for the purpose specified.

13. In a current motor, the combination of a rotatable frame, radially movable wings thereon, curtains mounted around the axis of the frame and connected to the inner edges of the wings, whereby said curtains will follow the movement of said wings, transverse reinforcing strips on said curtains, and guide strips at the edges of the same, the ends of said reinforcing strips engaging said guide strips for the purpose specified.

14. In a current motor, the combination of radial wings, each comprising a plurality of independently pivoted blades adapted to close the wing when receiving the impact of the current, and means for releasing said blades permitting them to open and allow the current to flow through the wings for stopping the motor.

15. In a current motor, the combination of radial wings, each comprising a plurality of blades hinged near one of their edges and adapted to have their opposite edges overlap the hinged edges of the adjacent blades when said wings receive the impact of the current, and means for releasing said overlapping portions, whereby the blades are permitted to open, allowing the current to flow through the wings for stopping the motor.

16. In a current motor, the combination of radial wings, each comprising a plurality of blades hinged near corresponding edges and having their opposite edges extending in the same direction and adapted to overlap the hinged edges of the adjacent blades, a stop for the free edge of the end blade, and means for releasing the blades from the overlaps and said stop, whereby said blades are permitted to open, allowing the current to flow through the wings for stopping the motor.

17. In a current motor, the combination of radial wings, each comprising a plurality of blades hinged near corresponding edges and having their opposite edges extending in the same direction and adapted to overlap the hinged edges of the adjacent blades, the width of the blades from their pivotal points to their free edges being less than the distance between pivotal points of adjacent blades, a stop for the free edge of the end blade, and means for releasing the latter from said stop, whereby said end blade and all the other blades in succession are permitted to open, allowing the current to flow through the wings for stopping the motor.

18. In a current motor, the combination of radial wings, each having a pivoted blade, a stop normally arranged in the path of the free edge of said blade for arresting the same in position to receive the impact of the current, and means for releasing the free edge of the blade from said stop whereby said blade is permitted to swing with the current for stopping the motor.

19. In a current motor, the combination of a rotatable frame provided with radial wings, each having a pivoted blade provided with a notch in its free edge, a stop for arresting said blade in position to receive the impact of the current, and means for altering the relative positions of said stop and blade to bring said stop and notch into register, whereby said blade is permitted to swing with the current for stopping the motor.

20. In a current motor, the combination of a rotatable frame provided with radial wings, each having a pivoted blade provided with a notch in its free edge, a stop for arresting said blade in position to receive the impact of the current, and means to move said blade relative to said stop for bringing the latter and the notch into register whereby said blade is permitted to swing with the current for stopping the motor.

21. In a current motor, the combination of a rotatable frame provided with radial wings, each having a pivoted blade provided with a notch in its free edge, a stop for arresting said blade in position to receive the impact of the current, a projection, a track fixed against rotation and adapted to engage said projection for bringing said stop and notch into register, whereby the blade is permitted to swing with the current for stopping the motor.

22. In a current motor, the combination of a rotatable frame provided with radial wings, each having a pivoted blade provided with a notch in its free edge, a stop for arresting said blade in position to receive the impact of the current, a projection on said blade, a track fixed against rotation and adapted to engage said projection for moving the blade to bring its notch into register with said stop thereby permitting said blade to swing with the current for stopping the motor.

23. In a current motor, the combination of a rotatable frame provided with radial wings, each having a pivoted blade, a stop for arresting said blade in position to receive the impact of the current, a projection adapted, when moved, to alter the relative positions of the blade and stop for releasing the former from the latter, thereby permitting said blade to swing with the current for stopping the motor, a track fixed against rotation and normally arranged out of the path of said projection, and means for moving said track into the path of the projection for actuating the latter.

24. In a current motor, the combination of a rotatable frame provided with radial wings, each having a pivoted blade, a stop for arresting said blade in position to receive the impact of the current, a projection adapted, when moved, to alter the relative positions of the blade and stop for releasing the former from the latter, thereby permitting said blade to swing with the current for stopping the motor, a roller on said projection, a track fixed against rotation and arranged normally out of the path of said roller, and means for moving said track into the path of the roller for actuating the projection.

25. In a current motor, the combination of a rotatable frame provided with radial wings, each having a pivoted blade, a stop for arresting said blade in position to receive the impact of the current, a projection on the pivotal axis of said blade, a track fixed against rotation and arranged normally out of the path of said projection, and means for moving said track into the path of the projection for moving the blade to release it from the stop, thereby permitting said blade to swing with the current for stopping the motor.

26. In a current motor, the combination of a stationary framework, a rotatable frame mounted thereon and provided with radial wings, each having a pivoted blade, a stop for arresting said blade in position to receive the impact of the current, a projection on the wing adapted, when moved, to release the blade from the stop, thereby permitting said blade to swing with the current for stopping the motor, a track supported on said framework normally out of the path of said projection, a lever also mounted on the framework and adapted to move said track into the path of the projection for moving the latter, and means for actuating said lever.

27. In a current motor, the combination of a rotatable frame provided with radial wings, each having a pivoted blade, a stop for arresting said blade in position to receive the impact of the current, means for moving said wings outwardly when they are to receive said impact, an automatically collapsible curtain for closing the space near the axis of the frame which is vacated when said wing is moved outwardly, and means for releasing said blade from its stop and for disconnecting said curtain whereby the blade is permitted to turn with the current and the curtain is allowed to collapse for stopping the motor.

28. In a current motor, the combination of a rotatable frame provided with radial wings, each having a pivoted blade, a stop for arresting said blade in position to receive the impact of the current, means for moving said wings outwardly when they are to receive said impact, an automatically collapsible curtain for closing the space near the axis of the frame which is vacated when said wing is moved outwardly, a projection from the blade adapted, when moved, to release the latter from said stop, permitting said blade to swing with the current, means attached to said projection and movable with it for releasing the curtain so that it may collapse, and means for actuating said projection.

29. In a current motor, the combination of a rotatable frame provided with radial wings, each having a pivoted blade, a stop for arresting said blade in position to receive the impact of the current, means for moving said wings outwardly when they are to receive said impact, an automatically collapsible curtain for closing the space near the axis of the frame which is vacated when said wing is moved outwardly, and means to simultaneously release said blade and curtain for stopping the motor.

30. In a current motor, the combination of a rotatable frame provided with radial wings, each having a pivoted blade, a stop for arresting said blade in position to receive the impact of the current, means for moving said wings outwardly when they are to receive said impact, an automatically collapsible curtain for closing the space near the axis of the frame which is vacated when said wing is moved outwardly, a projection from the blade adapted, when moved, to release the latter from the stop, permitting said blade to swing with the current, means for disconnecting the curtain including a pivoted arm having its free end portion engaging said projection and movable therewith, and means for actuating said projection.

31. In a current motor, the combination of a rotatable frame, radially movable wings thereon, curtains for closing the spaces near the axis of the frame which are vacated when said wings are moved outwardly, guide strips at the edges of said curtains, a reinforcing rod carried by the outer end portion of each curtain and having means embracing its guide strips, a latch on said rod, a keeper on the inner edge of the wing, one of said guide strips being movable for releasing said latch from said keeper, and means for actuating said movable strip.

32. In a current motor, the combination of a rotatable frame, radially movable wings thereon, curtains for closing the spaces near the axis of the frame which are vacated when said wings are moved outwardly, a latch on the outer edge of each curtain, a keeper on the inner edge of each wing, and means for releasing said latches from said keepers when it is desired to stop the motor.

33. In a current motor, the combination of a rotatable frame, radially movable wings thereon, automatically collapsible curtains for closing the spaces near the axis of the frame which are vacated when said wings are moved outwardly, guide strips at the edges of said curtains, one of said strips for each curtain being pivoted, a reinforcing rod carried by the outer end portion of each curtain, devices at the ends of said rod embracing its guide strips, one of said embracing devices being mounted to slide on the rod, resilient means for normally retaining the latter embracing device in engagement with the non-pivoted guide strip, a latch on said rod, a keeper on the inner edge of the wing and normally engaged by said latch, and means for swinging said pivoted guide strip for moving said rod to release said latch from said keeper.

34. In a current motor, the combination of a rotatable frame, radially movable wings thereon, means to reciprocate said wings, roller curtains mounted around the axis of the frame and detachably connected to the respective wings, whereby said curtains will be reciprocated with said wings, and means for disconnecting said curtains from said wings when it is desired to stop the motor.

35. In a current motor, the combination of a rotatable frame, radially movable wings thereon, automatically collapsible curtains adapted to close the spaces near the axis of said frame which are vacated when said wings are moved outward, guide strips arranged in spaced pairs at the extensible edges of said curtains, and devices on said curtains embracing and adapted to slide upon said guide strips, each of said embracing devices comprising an intermediate portion fitting between its pair of guide strips, and portions engaging the outer faces of said strips at both sides of said intermediate portion for the purpose specified.

36. In a current motor, the combination of a rotatable frame provided with radial wings, each having a pivoted blade normally adapted to be arrested in position to receive the impact of the current, means to release said wings permitting them to swing with the current for stopping the motor, and means for starting the motor again.

37. In a current motor, the combination with a rotatable frame, of means to start the motor comprising projections on the frame, an oscillatory plate, spaced projections on said plate adapted to engage the projections on the frame but normally arranged out of the plane thereof, means to bring said projections on the plate into the plane of those on the frame, and means to oscillate said plate.

38. In a current motor, the combination with a rotatable frame, of means for starting the motor comprising a projection on said frame, an oscillatory member, a projection on said member adapted to engage the projection on the frame but normally arranged out of the plane thereof, means for moving the projection on said member into the plane of the projection on the frame, and means to oscillate said member.

39. In a current motor, the combination with a rotatable frame, of means for starting the motor comprising a projection on said frame, an oscillatory member, a projection on said member adapted to engage the projection on the frame but normally arranged out of the plane thereof, and means to simultaneously oscillate said member and move its projection into the plane of the projection on the frame.

40. In a current motor, the combination with a rotatable frame, of means for starting the motor comprising a projection on said frame, an oscillatory member, a projection on said member adapted to engage the projection on said frame but normally arranged out of the plane thereof, means for moving the projection on said member into the plane of the projection on the frame, means to oscillate said member, and a spring-pressed ratchet pin carried by one of said projections for the purpose specified.

41. In a current motor, the combination with a rotatable frame, of means for starting the motor comprising a projection on said frame, an oscillatory member, a projection on said member adapted to engage the projection on said frame but normally arranged out of the plane thereof, means to oscillate said member, and means whereby the projection on said member is moved into the plane of the projection on the frame during the initial oscillatory movement of said member.

42. In a current motor, the combination with a rotatable frame, of means for starting the motor comprising a projection on said frame, an oscillatory member, a projection on said member adapted to engage the projection on said frame but normally arranged out of the plane thereof, a lug on said member, a fixed cam extending into the path of said lug, and means to oscillate said member whereby said lug is caused to ride on said cam for moving the projection on said member into engagement with the projection on the frame for turning the latter.

43. In a current motor, the combination with a rotatable frame, of means for starting the motor comprising a projection on said frame, an oscillatory member, a projection on said member adapted to engage the projection on said frame but normally arranged out of the plane thereof, a lug on said member, a fixed cam extending into the path of said lug and comprising an inclined portion and a straight portion, and means to oscillate said member whereby said lug is caused to ride first on the inclined portion of said cam to bring the projection on said member into the plane of the projection on said frame, and then on the straight portion of said cam to bring said projections into engagement for turning the frame.

44. In a current motor, the combination with a shaft, of a frame rotatably mounted thereon and having a projection on one end, an oscillatory member pivoted on the shaft and having a projection adapted to engage the projection on said frame, resilient means interposed between said frame and member for normally holding the latter with its projection out of the plane of the projection on the frame, means for oscillating said member, and means for moving the same in opposition to said resilient means during such oscillation for bringing said projections into engagement and starting the motor.

45. In a current motor, the combination of a rotatable frame having a projection, an oscillatory member having a projection adapted to engage the projection on said frame for starting the motor, but normally arranged out of the plane of said latter projection, means for moving said member a limited distance in one direction to bring said projections into engagement and turn the frame, and means for automatically returning said member to normal position when released.

In testimony whereof I affix my signature in the presence of two witnesses.

CHARLES B. MURDOCK.

Witnesses:
LOUIS J. CROLLARD,
FERN TREXLER.

Copies of this patent may be obtained for five cents each, by addressing the "Commissioner of Patents, Washington, D. C."